(12) United States Patent
Minamino et al.

(10) Patent No.: US 6,665,250 B1
(45) Date of Patent: Dec. 16, 2003

(54) OPTICAL DISC PLAYBACK AND PLAYBACK METHOD

(75) Inventors: Junichi Minamino, Nara (JP); Hiromichi Ishibashi, Ibaraki (JP); Shigeru Furumiya, Himeji (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 71 days.

(21) Appl. No.: 10/111,330

(22) PCT Filed: Oct. 27, 2000

(86) PCT No.: PCT/JP00/07588

§ 371 (c)(1), (2), (4) Date: Apr. 23, 2002

(87) PCT Pub. No.: WO01/33568

PCT Pub. Date: May 10, 2001

(30) Foreign Application Priority Data

Oct. 29, 1999 (JP) ............................................. 11/308867

(51) Int. Cl.[7] ................................................. G11B 7/00
(52) U.S. Cl. ................ 369/59.1; 369/59.15; 369/59.17
(58) Field of Search ........................ 369/59.17, 124.01, 369/124.15, 59.1, 59.15

(56) References Cited

U.S. PATENT DOCUMENTS 5,675,569 A    10/1997   Yamaguchi et al.
6,278,675 B1 * 8/2001   Kuribayashi et al. .... 369/59.17

FOREIGN PATENT DOCUMENTS

| EP | 0 940 811    | 8/1999  |
|----|--------------|---------|
| EP | 0 940 811    | 9/1999  |
| JP | 4-232659     | 8/1992  |
| JP | 8-106724     | 4/1996  |
| JP | 8-263846     | 10/1996 |
| JP | 11-259985    | 9/1999  |
| JP | 2000-182328  | 6/2000  |

OTHER PUBLICATIONS

Patent Abstracts of Japan, vol. 1999, No. 08, Jun. 30, 1999 & JP 11 066746 A (NEC Corp), Mar. 9, 1999.

* cited by examiner

*Primary Examiner*—Nabil Hindi
(74) *Attorney, Agent, or Firm*—Wenderoth, Lind & Ponack, L.L.P.

(57) ABSTRACT

An optical disc playback apparatus capable of signal processing so that the above-noted new jitter does not appear even when a waveform equalizer is used is provided. A trimmer is inserted before the waveform equalizer, the maximum amplitude in the positive direction of the playback signal waveform and the maximum amplitude in the negative direction are limited so that amplitude in the positive direction and amplitude in the negative direction are substantially equal. Jitter in the playback signal can be improved as a result.

6 Claims, 11 Drawing Sheets

THRESHOLD VALUE Vth

WAVEFORM EQUALIZATION

OPTICAL DISC PLAYBACK AND PLAYBACK METHOD

TECHNICAL FIELD OF THE INVENTION

The present invention relates to a playback apparatus and playback method for reading marks or spaces written to an optical disc.

RELATED ART

Writable optical discs are written with combinations of marks and spaces between marks. Mark length is 3T, 4T, 5T, 6T, 7T, 8T, 9T, 10T, or 11T, and space length is also 3T, 4T, 5T, 6T, 7T, 8T, 9T, 10T, or 11T. T denotes the period of the channel clock. The physical length of the shortest mark, 3T, is approximately 0.4 $\mu$m, and the diameter (half width) of the light spot of the laser beam forming the marks is approximately 0.6 $\mu$m. Because of the distribution of the light intensity of the light spot, that is, because light spot intensity is greatest in the center and weakens to the periphery, momentary exposure to the light spot forms slightly smaller 0.4 $\mu$m marks instead of 0.6 $\mu$m marks.

When marks are recorded to an optical disc two short marks could be recorded with a short space therebetween, such as when a 3T mark, 3T space, and 3T mark (denoted as 3Tm-3Ts-3Tm) are formed. When reproducing a 3Tm-3Ts-3Tm sequence thus recorded jitter occurs in the playback signal due to intersymbol interference, and 0 and 1 read errors occur.

Figure 6:
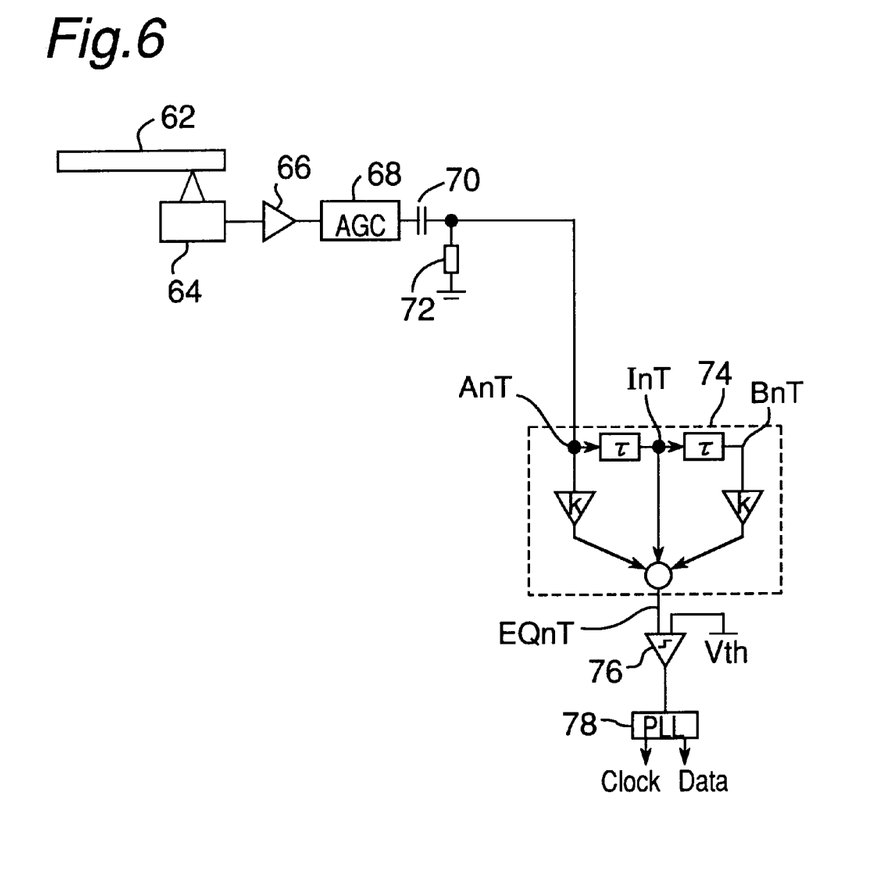
FIG. 6 shows a conventional playback apparatus.

FIG. 6 shows an optical disc playback apparatus according to the prior art. Reference numeral 62 is an optical disc, 64 is an optical head, 66 is an amplifier, 68 is an automatic gain controller, 70 is a capacitance, and 72 is a resistance; 74 is waveform equalizer for amplifying the frequency band of the reproduced signal, 76 is a digitizer, and 78 is a phase-locked loop.

As shown in FIG. 6, a waveform equalizer 74 is conventionally inserted before the digitizer 76 in order to resolve the above-noted intersymbol interference. The playback wave is amplified by the waveform equalizer 74. This operation is shown in FIG. 7.

Figure 7A:
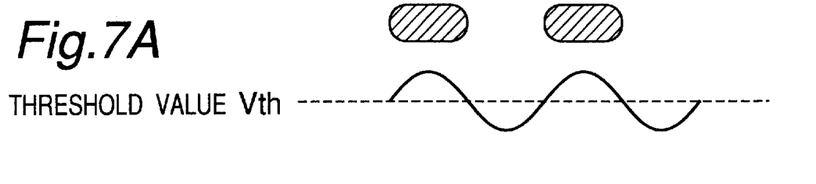
FIG. 7(a) to FIG. 7(f) are waveform diagrams of signals obtained from a conventional playback apparatus.
Figure 7B:
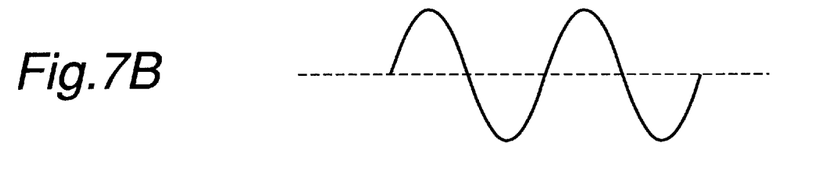
Figure 7C:
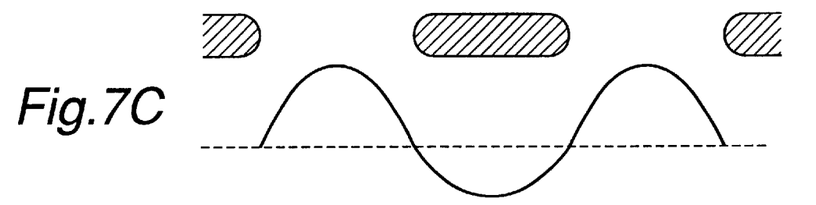
Figure 7D:
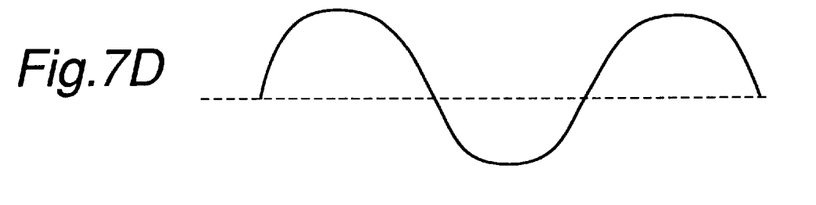

FIGS. 7(a) and (b) show a signal reproduced from short marks and the reproduced signal after amplification by the waveform equalizer 74. FIGS. 7(c) and (d) show a signal reproduced from long marks and the reproduced signal after amplification by the waveform equalizer 74. The line shown in the middle of each signal denotes the threshold value Vth of the digitizer 76. A 1 is output from the digitizer 76 when this threshold value Vth is exceeded, and a 0 is output when less than or equal to the threshold value Vth. Jitter in the playback signal is thus reduced by the waveform equalizer 74 amplifying the high frequency band of the playback signal.

Figure 7E:
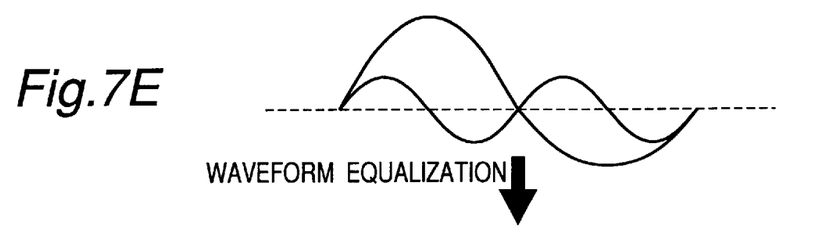
Figure 7F:
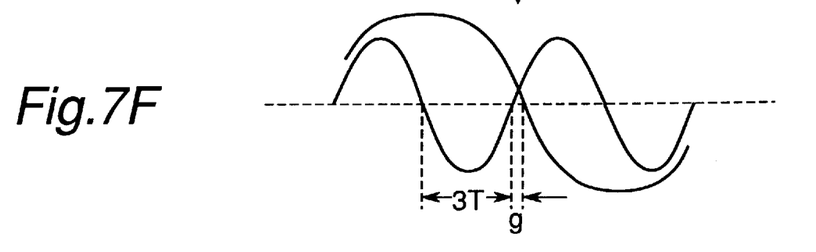

When a waveform equalizer 74 is not used, or when equalization coefficient K is weak, the point where the long mark playback signal intersects the threshold potential and the point where the short mark playback signal intersects the threshold potential can be matched as shown in FIG. 7(e) by inputting the optical disc playback signal directly to the digitizer 76, but if the optical disc playback signal is input to the digitizer 76 through a waveform equalizer 74 with a high equalization coefficient K, the point where the long mark playback signal intersects the threshold potential will be shifted offset g as shown in FIG. 7(f). This offset is a new source of jitter in the playback signal. This new jitter becomes increasingly pronounced as the recording density increases or the equalization coefficient K increases.

SUMMARY OF THE INVENTION (Technical Problem to be Solved by the Invention)

An object of the present invention is to provide an optical disc playback apparatus capable of signal processing so that the above-noted new jitter does not appear even when a waveform equalizer is used.

(Method of Resolving the Problem)

A playback apparatus according to a first aspect of the present invention for reading marks or spaces ("marks" below) written to an optical disc is characterized by comprising:

an optical head means for emitting a light spot to a mark, reading the mark, and outputting a playback signal;

a trimmer means for limiting at least the greater of positive amplitude or negative amplitude in the playback signal output from the optical head relative to a specified threshold value for converting to a binary signal so that both positive and negative amplitudes are substantially equal;

a waveform equalization circuit for amplifying the high frequency band of the output signal from the trimmer means; and a digitizing circuit for converting the output signal from the waveform equalization circuit to a binary signal using the specified threshold value.

A second aspect of the invention is a playback apparatus according to the first aspect wherein the trimmer means limits amplitude in the positive direction only.

A third aspect of the invention is a playback apparatus according to the first aspect wherein the trimmer means limits amplitude in the positive direction and amplitude in the negative direction.

A fourth aspect of the invention is a playback apparatus according to the third aspect wherein the amount cut by limiting amplitude in the positive direction is 55% or less of the maximum positive amplitude, and the amount cut by limiting amplitude in the negative direction is 50% or less of the maximum amplitude in the negative direction.

A fifth aspect of the invention is a playback apparatus according to the third aspect wherein the trimmer means limits amplitude in the positive direction and amplitude in the negative direction in signals of an (n+2)T or longer mark length, and does not limit amplitude in the positive direction and amplitude in the negative direction in signals of an nT or (n+1)T mark length in modulation code where the shortest mark is nT (where n is a positive integer and T is the period of the channel clock).

A sixth aspect of the invention is a playback apparatus according to the first aspect wherein the trimmer means limits amplitude when the ratio ML/Wh between pit length ML on the optical disc and half width Wh of the light spot satisfies the following relationship:

$$ML/Wh \geq R$$

$$1.0 \leq R \leq 1.35.$$

A seventh aspect of the invention is a playback apparatus according to the first aspect wherein the ratio between the shortest mark length MLmin of the optical disc and the half width Wh of the light spot satisfies the relationship MLmin/Wh <0.82.

An eighth aspect of the invention is a playback method for reading marks written to a writable optical disc, comprising:

a step for emitting a light spot from an optical head to a mark, reading the mark, and outputting a playback signal;

a step for limiting at least the greater of positive amplitude or negative amplitude in the playback signal output from the optical head relative to a specified threshold value for converting to a binary signal so that both positive and negative amplitudes are substantially equal;

a step for amplifying the signal of substantially equal positive and negative amplitudes; and a step for converting the amplified signal to a binary signal using the specified threshold value.

A ninth aspect of the invention is a playback method according to the eighth aspect wherein the step for substantially equalizing positive and negative amplitudes limits amplitude in the positive direction only.

A tenth aspect of the invention is a playback method according to the eighth aspect wherein the step for substantially equalizing positive and negative amplitudes limits amplitude in the positive direction and amplitude in the negative direction.

An eleventh aspect of the invention is an optical disc playback method according to the tenth aspect wherein the amount cut by limiting amplitude in the positive direction is 55% or less of the maximum positive amplitude, and the amount cut by limiting amplitude in the negative direction is 50% or less of the maximum amplitude in the negative direction.

A twelfth aspect of the invention is an optical disc playback method according to the tenth aspect wherein the trimmer means limits amplitude in the positive direction and amplitude in the negative direction in signals of (n+2)T or longer mark length, and does not limit amplitude in the positive direction and amplitude in the negative direction in signals of nT or (n+1)T mark length when the shortest mark of the modulation code is nT (where n is a positive integer and T is the period of the channel clock).

A thirteenth aspect of the invention is an optical disc playback method according to the eighth aspect wherein amplitude is limited by the step for substantially equalizing positive and negative amplitudes when the ratio ML/Wh between pit length ML on the optical disc and half width Wh of the light spot satisfies the following relationship:

$$ML/Wh \geq R$$

$$1.0 \leq R \leq 1.35.$$

A fourteenth aspect of the invention is an optical disc playback apparatus according to the eighth aspect wherein the ratio between the shortest mark length MLmin of the optical disc and the half width Wh of the light spot satisfies the relationship $$ML\min/Wh < 0.82.$$

(Benefits More Effective Than the Prior Art)

An optical disc playback apparatus and method capable of signal processing without producing jitter can be provided by means of the present invention.

BEST MODE FOR ACHIEVING THE INVENTION

First Embodiment

Figure 1:
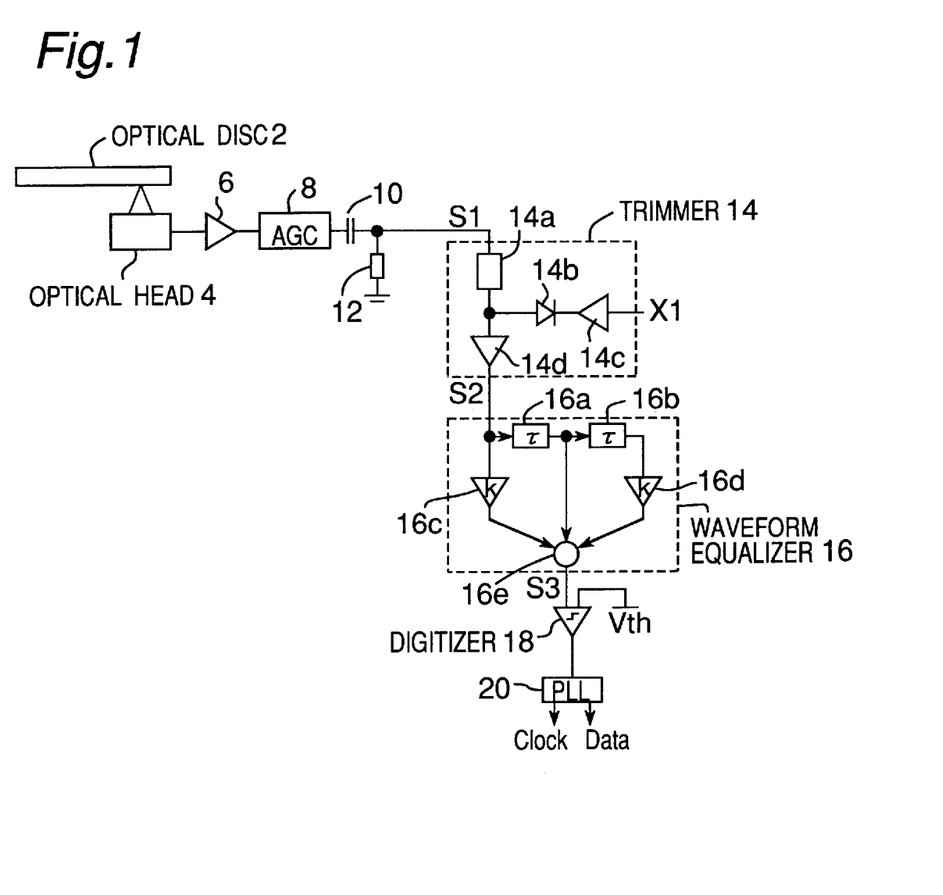
FIG. 1 shows a playback apparatus according to a first embodiment of the invention.

FIG. 1 shows a first embodiment of an optical disc playback apparatus according to the present invention. In FIG. 1 reference numeral 2 is an optical disc, 4 is an optical head, 6 is an amplifier, 8 is an automatic gain controller, 10 is a capacitance, and 11 is a resistance. Reference numeral 14 is a trimmer for limiting the maximum amplitude in the positive direction, 16 is a waveform equalizer for amplifying the reproduced sinusoidal wave, 18 is a digitizer, and 20 is a phase-locked loop.

The trimmer 14 comprises a resistance 14a, diode 14b, buffer 14c, and buffer 14d; signal X1 specifying the upper limit is input to the input of buffer 14c.

The waveform equalizer 16 comprises delay circuits 16a and 16b, amplifiers 16c and 16d, and adder 16e.

Operation is described next.

A writable optical disc 2 is recorded using combinations of phase-change marks and spaces between marks. Mark length is 3T, 4T, 5T, 6T, 7T, 8T, 9T, 10T, or 11T, and space length is also 3T, 4T, 5T, 6T, 7T, 8T, 9T, 10T, or 11T. T denotes the period of the channel clock. The shortest mark or space in this case is 3T, having a physical length of approximately 0.2 μm to 0.4 μm; the diameter (half width) of the light spot of the laser beam for reproducing marks is approximately 0.4 μm to 0.6 μm. The longest mark or space in this case is 11T, having a physical length of approximately 0.7 μm to 1.5 μm A playback signal of the marks and spaces (collectively referred to below as "marks") read by the optical head 4 is amplified by amplifier 6 and automatic gain controller 8, unnecessary frequency components are cut by capacitances 10 and 12, and the signal is input to the trimmer 14. The signal input to the trimmer 14 is S1, the signal output form the trimmer 14 is S2, and the signal output from the waveform equalizer 16 is S3.

Figure 2A:
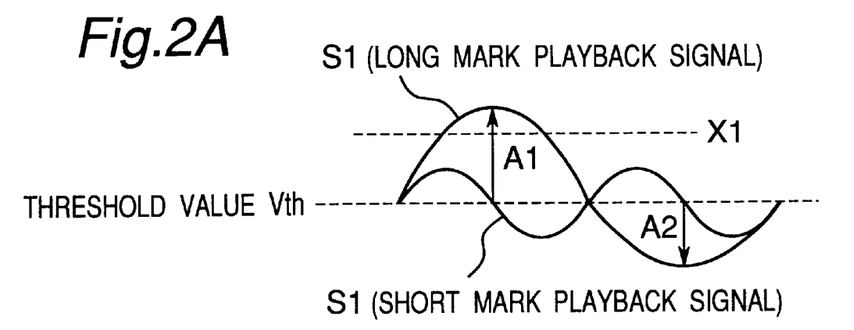
FIG. 2(a) to FIG. 2(c) are waveform diagrams of signals obtained from the playback apparatus in FIG. 1.

FIG. 2(a) shows a playback signal S1 for a long mark and a playback signal S1 for a short mark. That A1>A2 when amplitude A1 in the positive direction from the threshold value Vth and amplitude A2 in the negative direction are compared was observed from experiments as a feature of this playback signal S1. In other words, amplitude in the positive direction and amplitude in the negative direction with respect to threshold value Vth are asymmetrical.

Figure 2B:
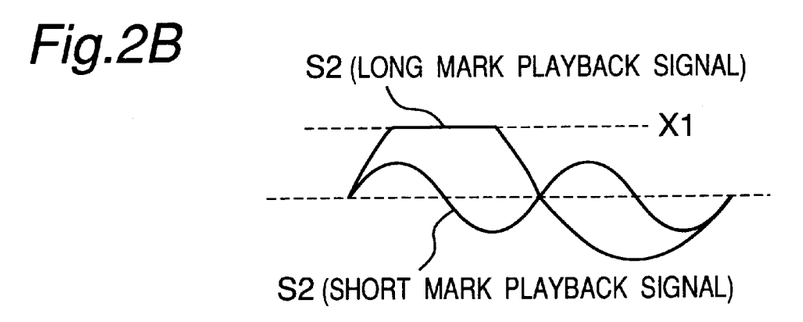

The trimmer 14 is a circuit for eliminating or reducing this asymmetry. That is, when amplitude A1 in the positive direction exceeds the level of X1, the trimmer 14 cuts off the signal at the level of X1 and thus limits the maximum amplitude A1 in the positive direction to the level of X1. Playback signal S2 is shown in FIG. 2(b). Long mark playback signal S2 is cut off at level X1, but short mark playback signal S2 is less than or equal to level X1 and is therefore not cut off.

Figure 2C:
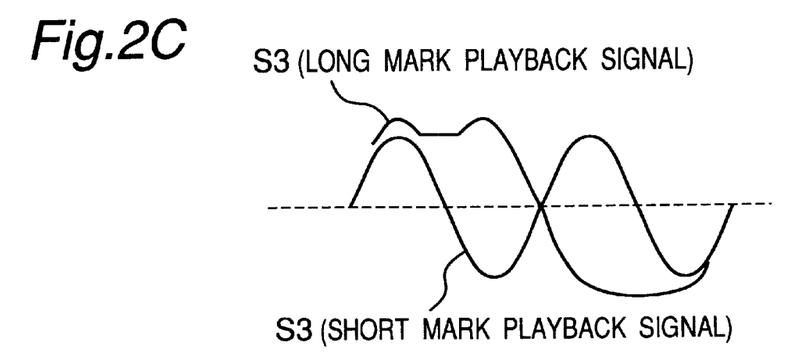

Playback signal S2 is input to the waveform equalizer 16 and amplified. The amplified signal S3 is shown in FIG. 2(c). The waveform equalizer 16 works to increase the slope of the wave. Overshoot therefore appears at the edge cut off at level X1. Thus, when playback signal S2 cutoff at level X1, and particularly long mark playback signal S2, is amplified by the waveform equalizer 16, the offset at the intersection of the playback signal S2 with threshold value Vth is greatly reduced. Producing new jitter in the playback signal as a result of this offset is thus avoided. As a result, playback signal jitter can be improved.

Second Embodiment

Figure 3:
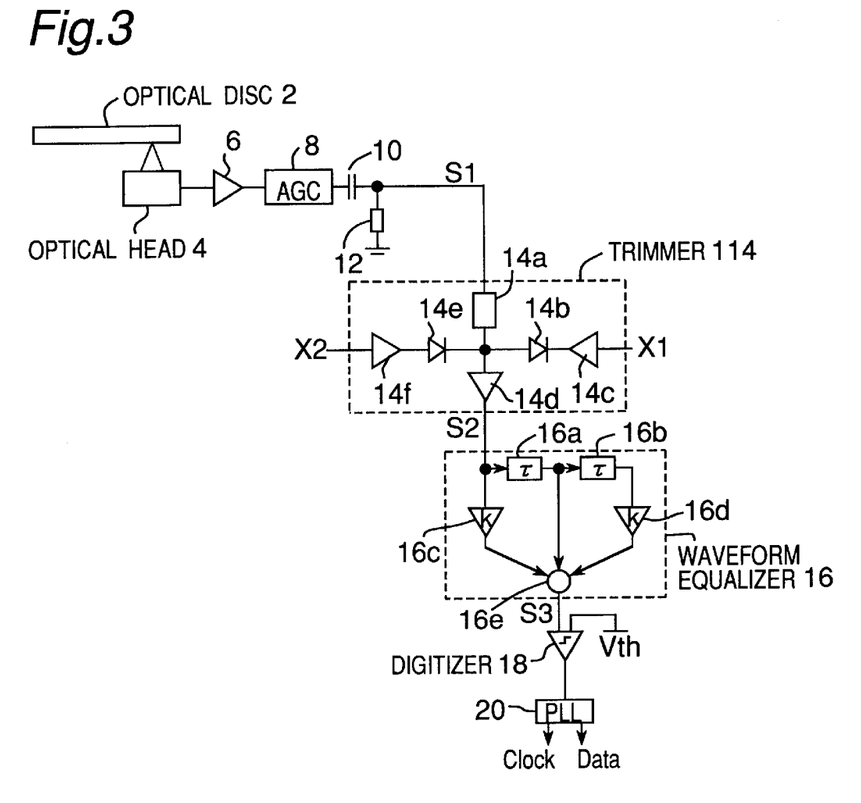
FIG. 3 shows a playback apparatus according to a second embodiment of the invention.

FIG. 3 shows a second embodiment of an optical disc playback apparatus according to the present invention. Compared with FIG. 1, the optical disc playback apparatus shown in FIG. 3 differs in the configuration of the trimmer 114, and because the configuration of other parts is the same as the configuration of the optical disc playback apparatus shown in FIG. 1 only the configuration of the trimmer 114 is described below and description regarding the configuration of other parts is omitted.

The trimmer 114 comprises a resistance 14a, diodes 14b and 14e, buffers 14c and 14f, and buffer 14d; signal X1 specifying the upper limit is input to the input of buffer 14c and signal X2 specifying the lower limit is input to the input of buffer 14f.

Operation is described next.

As above, a writable optical disc 2 to which marks are prerecorded is reproduced.

The signal input to the trimmer 114 is S1, the signal output form the trimmer 114 is S2, and the signal output from the waveform equalizer 16 is S3.

Figure 4A:
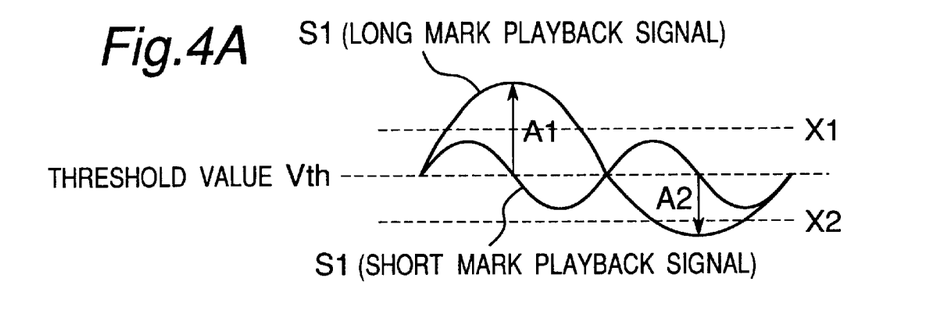
FIG. 4(a) to FIG. 4(c) are waveform diagrams of signals obtained from the playback apparatus in FIG. 3.

FIG. 4(a) shows a playback signal S1 for a long mark and a playback signal S1 for a short mark. That when amplitude A1 in the positive direction from the threshold value Vth and amplitude A2 in the negative direction are compared A1>A2 and are asymmetrical is the same as noted above.

Figure 4B:
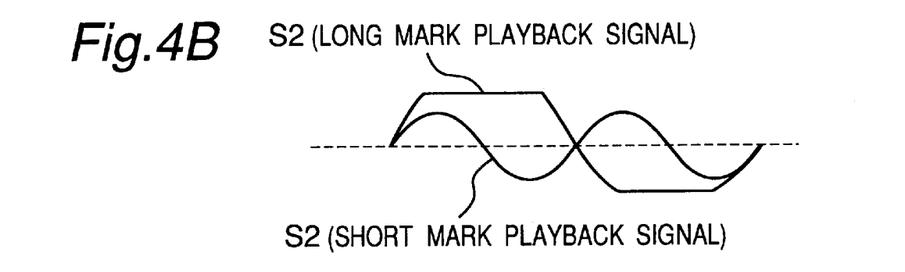

The trimmer 114 is a circuit for eliminating or reducing this asymmetry. That is, when amplitude A1 in the positive direction exceeds the level of X1, the trimmer 114 cuts off the signal at the level of X1 and thus limits the maximum amplitude A1 in the positive direction to the level of X1, and when amplitude A2 in the negative direction exceeds the level of X2, the trimmer 114 cuts off the signal at the level of X2 and thus limits the minimum negative amplitude A2. Playback signal S2 is shown in FIG. 4(b). Long mark playback signal S2 is cut off in the positive direction at level X1 and is cut off in the negative direction at level X2. The short mark playback signal S2 is between levels X1 and X2 and is therefore not cut.

Figure 4C:
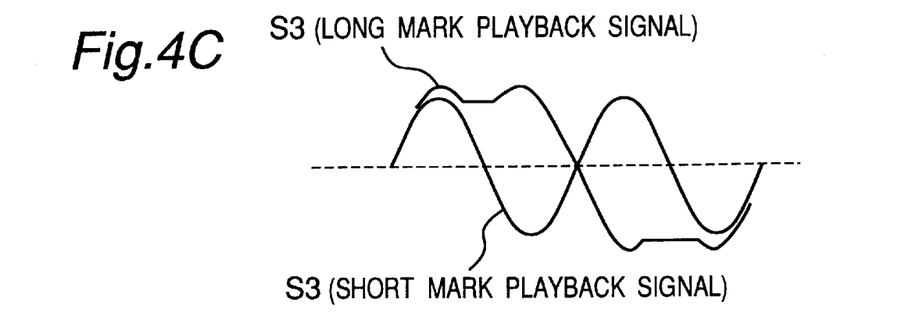

Playback signal S2 is input to the waveform equalizer 16 and amplified. The amplified signal S3 is shown in FIG. 4(c). The waveform equalizer 16 works to increase the slope of the wave. Overshoot therefore appears at the edges cut off at levels X1 and X2. Thus, when playback signal S2 cutoff at level X1 or X2, and particularly long mark playback signal S2, is amplified by the waveform equalizer 16, the offset at the intersection of the playback signal S2 with threshold value Vth is greatly reduced. Producing new jitter in the playback signal as a result of this offset is thus avoided. As a result, playback signal jitter can be improved.

How much jitter is improved when an optical disc having a shortest mark length of 0.333 $\mu$m is reproduced with a 0.6 $\mu$m diameter light spot is described next.

Jitter G (%) is obtained with the following equation.

$$G = \frac{\sqrt{g1^2 + g2^2 + \ldots + gm^2}}{mT} \times 100(\%)$$

where g1 to gm denote the offset (offset g shown in FIG. 7(f)) appearing in a specific interval in order.

Figure 5A:
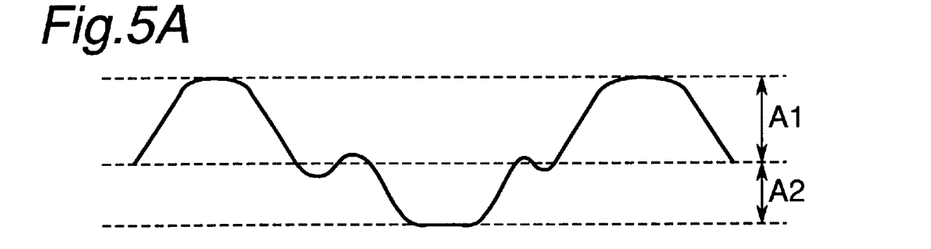
FIG. 5(a) to FIG. 5(d) are waveform diagrams in which the maximum or the maximum and minimum of the wave are limited by a trimmer.

In the prior art example shown in FIG. 6 jitter is 12.3%. In the playback signal S2 input to the waveform equalizer 74 in this case A1≈1.1 A2 as shown in FIG. 5(a).

Figure 5B:
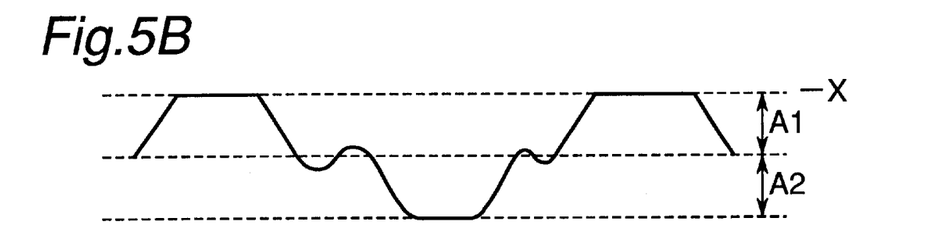

In the first embodiment shown in FIG. 1 jitter is 10.6%. As shown in FIG. 5(b), the amplitude of the playback signal S2 input to the waveform equalizer 16 in this case is cut off only in the positive direction and A1=A2. This was achieved by trimming the signal approximately 1% to 5% in the positive direction.

Figure 5C:
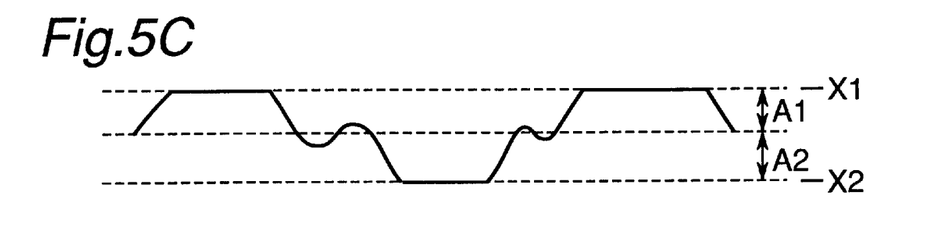

In the second embodiment shown in FIG. 3 jitter is 7.3%. As shown in FIG. 5(c), the amplitude of the playback signal S2 input to the waveform equalizer 16 in this case is cut off in the positive direction negative direction, and A1=A2. This was achieved by trimming the signal to approximately 5% to 55% in the positive direction, and to approximately 1% to 50% in the negative direction. That is, this was achieved by making the amount cut off as a result of limiting the positive amplitude 55% or less of the maximum positive amplitude, and making the amount cut off as a result of limiting the negative amplitude 50% or less of the maximum negative amplitude.

Figure 5D:
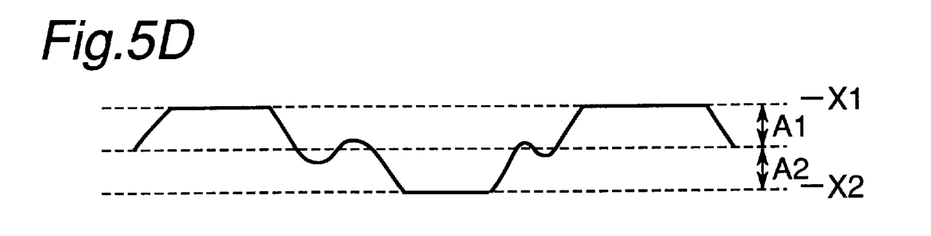

Furthermore, a jitter level of 6.9% was obtained as a result of finding the lowest jitter level achieved with the second embodiment shown in FIG. 3. As shown in FIG. 5(d), the signal amplitude of the playback signal S2 input to the waveform equalizer 16 in this case was cut off in both positive and negative directions, and A1≈1.1A2. This was also achieved by trimming to approximately 5% to 55% in the positive direction and 1% to 50% in the negative direction.

Cut-off levels X1 and X2 desirably do not cut the signal amplitude to the amplitude of a signal for a short mark such as a 3T mark. Cut-off levels X1 and X2 are preferably set so that (X1−Xth)≈(Vth−X2), that is, so that the positive amplitude and negative amplitude are substantially the same, but it is even further preferable for the positive amplitude (X1−Xth) to be 0.2% to several percent greater than the negative amplitude (Vth−X2).

The above example described a case in which a signal peak is greater in the positive direction than in the negative direction, but when the signal amplitude in the negative direction is greater than in the positive direction it is necessary to cut at least the amplitude in the negative direction.

How high of a playback signal the playback signal cut off at level X1 should be cut from is described next.

The light spot can be thought of as a Gaussian distribution. Movement of the light spot along the track over the marks and spaces can be thought of as a Gaussian distribution moving along the track over the marks and spaces. The level of a playback signal from an optical disc is determined by the area of the Gaussian distribution occupied by the mark. In other words, the playback signal level can be determined by adding the area of the Gaussian distribution occupied by a mark as a positive value and the area where a mark is not present as a negative value. Therefore, playback signal level=area of shaded part+(−area of unshaded part).

Figure 8A:
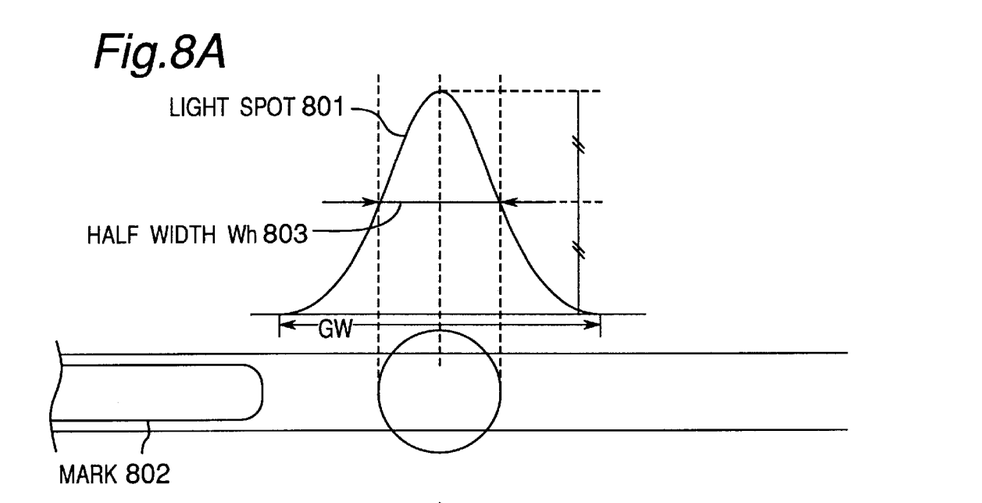
FIG. 8(a) to FIG. 8(c) show the relationship between a long mark and light spot presented as a Gaussian distribution.
Figure 8B:
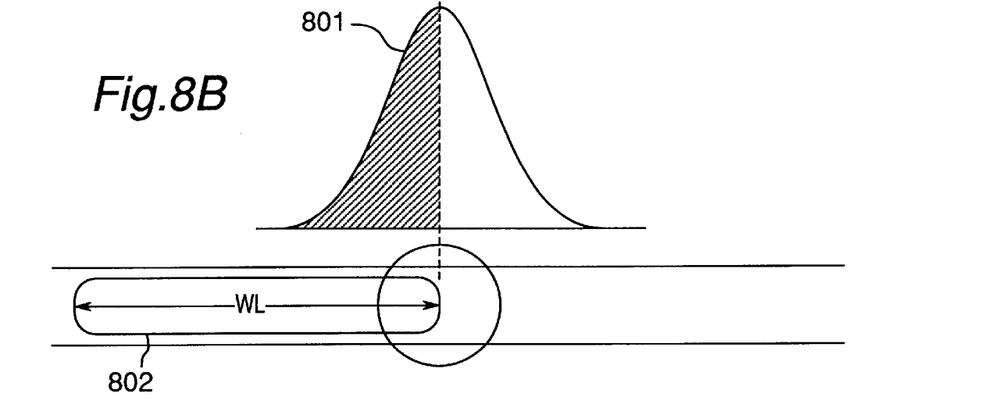
Figure 8C:
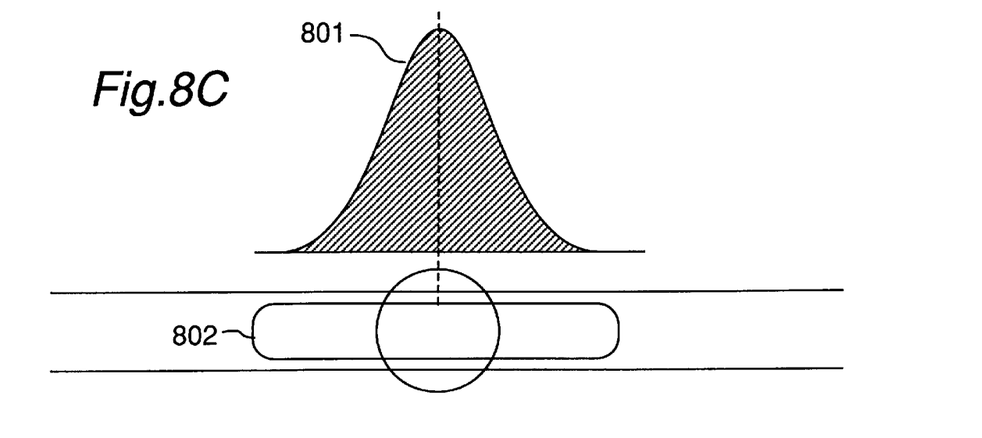

Note that the area of the Gaussian distribution is 1 in this example. As shown in FIG. 8(a), the playback signal level when a mark is not in the Gaussian distribution is −1. As shown in FIG. 8(b), when a mark covers half the Gaussian distribution, that is, when the leading edge of the mark is positioned at the middle of the Gaussian distribution, the playback signal level is 0. As shown in FIG. 8(c), when the mark completely fills the Gaussian distribution the playback signal level is +1. Thus, when the mark length ML is equal to or longer than the width GW of the Gaussian distribution, the playback signal level changes from −1 to 0 and then to +1 as indicated by line 900 in FIG. 9. The playback signal level goes to 0 precisely when the leading edge of the mark is positioned at the center of the Gaussian distribution.

Figure 9:
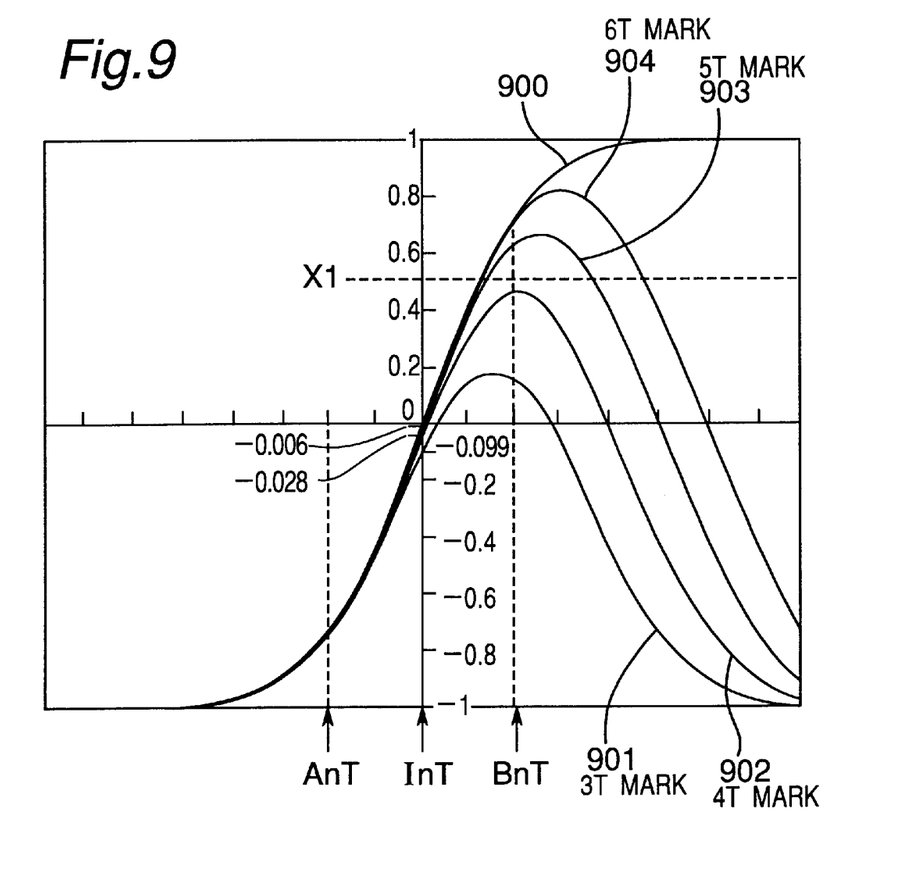
FIG. 9 is a graph showing signal waveforms for marks of various lengths.
Figure 10A:
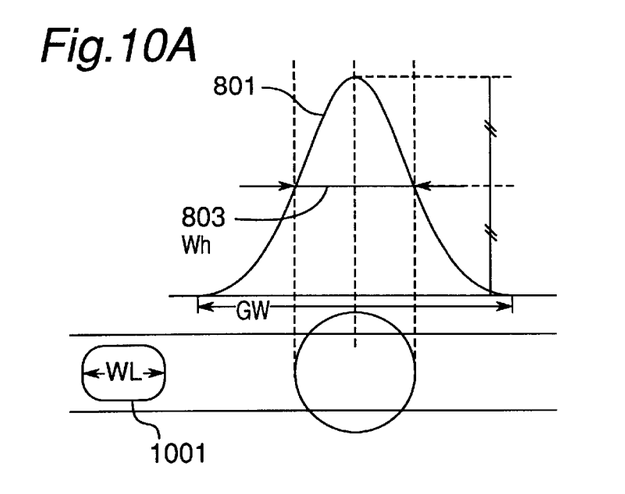
FIG. 10(a) to FIG. 10(c) show the relationship between a short mark and light spot presented as a Gaussian distribution.
Figure 10B:
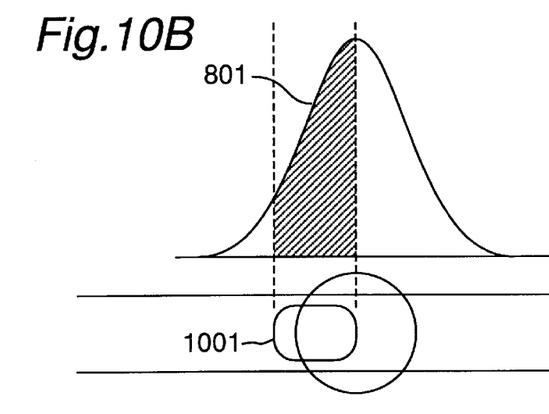
Figure 10C:
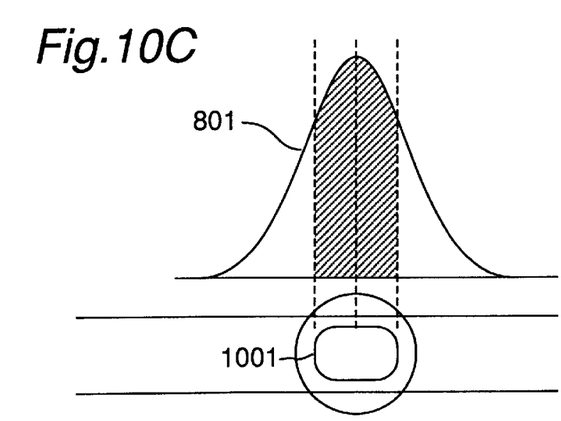

When the mark length ML is shorter than the width GW of the Gaussian distribution is examined next. As shown in FIG. 10(a) the playback signal level is −1 when no part of the mark is within the Gaussian distribution. As shown in FIG. 10(b), the playback signal level is a slightly negative value (−ΔS) rather than 0 when the leading edge of the mark is positioned at the center of the Gaussian distribution. As shown in FIG. 10(c), when the mark center is positioned at the center of the Gaussian distribution the playback signal level peaks but the peak value is slightly less than +1. It should be noted that FIGS. 8, 9, and 10 show a case using 8–16 modulation as the modulation code.

The playback signal level when the leading edge of the mark is positioned at the center of the Gaussian distribution (referred to below as the edge-center point) can be expressed using intersymbol interference −ΔS. The absolute value |−ΔS| of the playback signal level (−ΔS) at the edge-center point increases as the mark length ML becomes shorter than the width GW of the Gaussian distribution. That the playback signal level at this edge-center point moves from 0 in the negative direction is also considered a factor contributing to offset g.

The magnitude of level X1 in the present invention is therefore set SO that cut off at level X1 starts at the point where the playback signal level at the edge-center point substantially rises from a negative value to substantially 0, such as when it approaches to within −0.01 of 0, as the mark length ML is sequentially increased from the shortest mark length. In the case shown in FIG. 9 the playback signal level at the edge-center point of the waveform 901 for a 3T mark is −0.099, −0.028 for waveform 902 for a 4T mark, and −0.006 for waveform 903 for a 5T mark. Level X1 is therefore set between the peak of the 4T mark wave and the peak of the 5T mark wave.

Considered a different way, it is enough to trim signals using level X1 from a signal near where the mark length ML becomes equal to the width GW of the Gaussian distribution, or a signal near where the mark length ML becomes equal to the half width Wh of the light spot. That is, level X1 is set so that the signal is trimmed when $ML/Wh\Delta R$ $1.0 \leq R \leq 1.35$.

In FIG. 8 reference numeral 803 is the half width Wh of the light spot, indicating the width of the distribution where power is ½ the peak power of the light spot distribution, and is approximately 0.6 μm in a DVD.

The preceding description is further analyzed below using equations.

If the half width of the light spot is Wh, the playback signal level is −1 (minimum signal level) at a sufficiently long space, and the playback signal level is +1 (maximum signal level) at a sufficiently long mark, Gaussian distribution Sf(x) denoting the light spot can be expressed with equation 1 (x is the distance from the light spot center).

$$Sf(x) = \frac{\sqrt{\ln 2}}{\frac{Wh}{2} \cdot \sqrt{\pi}} \cdot e^{-\left(\frac{\sqrt{\ln 2}}{\frac{Wh}{2} \cdot \sqrt{\pi}} \cdot x\right)^2} \qquad \text{EQUATION 1}$$

The playback signal level at a certain time can be determined by subtracting the integral of all parts where the mark is not present from the integral of all parts where the mark is present as shown in equation 1. As will be known because a 1 results with a sufficiently long mark, the integral of applying equation 1 to the entire area is 1. Furthermore, when the light spot is positioned at the transition between a sufficiently long space and a sufficiently long mark, equation 1 is symmetrical for x=0, and the playback signal level is 0.

Intersymbol interference is described here using 8–16 modulation as the modulation code. For simplicity, intersymbol interference resulting from successive marks is described below assuming a signal in which a 3T mark, 4T mark, 5T mark, and 6T mark follow a sufficiently long space. The playback wave for the above is shown in FIG. 9. In FIG. 9 reference numeral 901 is a 3T mark, 902 is a 4T mark, 903 is a 5T mark, and 904 is a 6T mark.

The playback signal level when the light spot is located at the change between a sufficiently long space and an nT mark is shown by equation 2 in which equation 1 is integrated from 0 to (n×B1). B1 denotes the length on the optical disc per 1 channel bit, that is, per 1T, and (n×B1) is equivalent to the mark length. If the mark length of the shortest mark 3T is MLmin, B1=MLmin/3. It should be noted that 1T denotes temporal length and B1 denotes spatial length on disc.

$$I_{nT} = \frac{\sqrt{\ln 2}}{\frac{Wh}{2} \cdot \sqrt{\pi}} \left( \int_{n \cdot B1}^{\infty} e^{-\left(\frac{\sqrt{\ln 2}}{\frac{Wh}{2}} \cdot x\right)^2} \cdot dx - \int_{-\infty}^{n \cdot B1} e^{-\left(\frac{\sqrt{\ln 2}}{\frac{Wh}{2}} \cdot x\right)^2} \cdot dx \right) \qquad \text{EQUATION 2}$$

Here playback signal level EQnT using equalization by the prior art waveform equalizer 74 shown in FIG. 6 is obtained by multiplying both playback signal level AnT at time −τ and playback signal level Bnt at time +τ by coefficient K, and adding the results to playback signal level InT at time 0. Therefore:

$$EQnt=InT+K*AnT+K*BnT=Int+K*(AnT+BnT).$$

If the light spot travels distance d in time τ, AnT and BnT can be expressed by equation 3 and equation 4.

$$A_{nT} = \frac{\sqrt{\ln 2}}{\frac{Wh}{2}\cdot\sqrt{\pi}}\left(2\cdot\int_{d}^{n\cdot B1+d} e^{-\left(\frac{\sqrt{\ln 2}}{\frac{Wh}{2}}\cdot x\right)^2}\cdot dx - 1\right) \quad \text{EQUATION 3}$$

$$B_{nT} = \frac{\sqrt{\ln 2}}{\frac{Wh}{2}\cdot\sqrt{\pi}}\left(2\cdot\int_{d}^{n\cdot B1-d} e^{-\left(\frac{\sqrt{\ln 2}}{\frac{Wh}{2}}\cdot x\right)^2}\cdot dx - 1\right) \quad \text{EQUATION 4}$$

Intersymbol interference InT from 3T to 6T determined using equation 2 when, for example, the light spot half width Wh is 0.6 μm and the channel bit length B1 is 0.14 μm is:

13T=−0.099
14T=−0.028
15T=−0.006
16T=−0.001

AnT+BnT for 3T to 6T marks when distance d=2*B1 is:

A3T+B3T=−0.734+0.146=−0.588
A4T+B4T=−0.729+0.456=−0.273
A5T+B5T=−0.728+0.629=−0.099
A6T+B6T=−0.725+0.700=−0.028

If the tap coefficient K of the conventional equivalent circuit is −13T/(A3T+B3T)=−0.169 is chosen, intersymbol interference of 3T marks can be removed by equalization, but an error of 0.018 occurs with 4T marks, 0.011 with 5T marks, and 0.004 with 6T marks. Likewise, if the selected tap coefficient K is −14T/(A4T+B4T)=−0.103, intersymbol interference of 4T marks can be removed but an error of −0.039 occurs at 3T marks, 0.004 at 5T marks, and 0.002 at 6T marks. It is thus not possible to remove intersymbol interference for all marks with a conventional equalization circuit. In effect, equalization minimizes the average of the absolute value difference.

This is because the relationship between InT and AnT+BnT is not proportional. The equivalent circuit of the present invention therefore forces a nearly proportional relationship between InT and AnT+BnT by limiting the amplitude of 5T and longer playback signals in which the absolute value of intersymbol interference InT is less than 0.010, that is, 5T, 6T, 7T, . . . playback signals, by trimming to level X1, and limiting the amplitude to AnT and BnT so that the relationship between 13T and 14T is 13T:14T=(A3T+B3T):(A4T+B4T). If a proportional relationship is achieved and a coefficient K of K=−13T/(A3T+B3T)=−14T/(A4T+B4T) is selected, intersymbol interference can be eliminated for all marks.

More specifically, if AnT is amplitude limited at −0.578 and BnT is amplitude limited at 0.578, A3T+B3T=−0.578+0.146=−0.433
A4T+B4T=−0.578+0.456=−0.122
A5T+B5T=−0.578+0.578=0
A6T+B6T=−0.578+0.578=0, and if K=−0.230 is selected, error will be substantially 0, specifically 0 for 3T mark, 0 for a 4T mark, −0.006 for a 5T mark, and −0.001 for a 6T mark.

Figure 11:
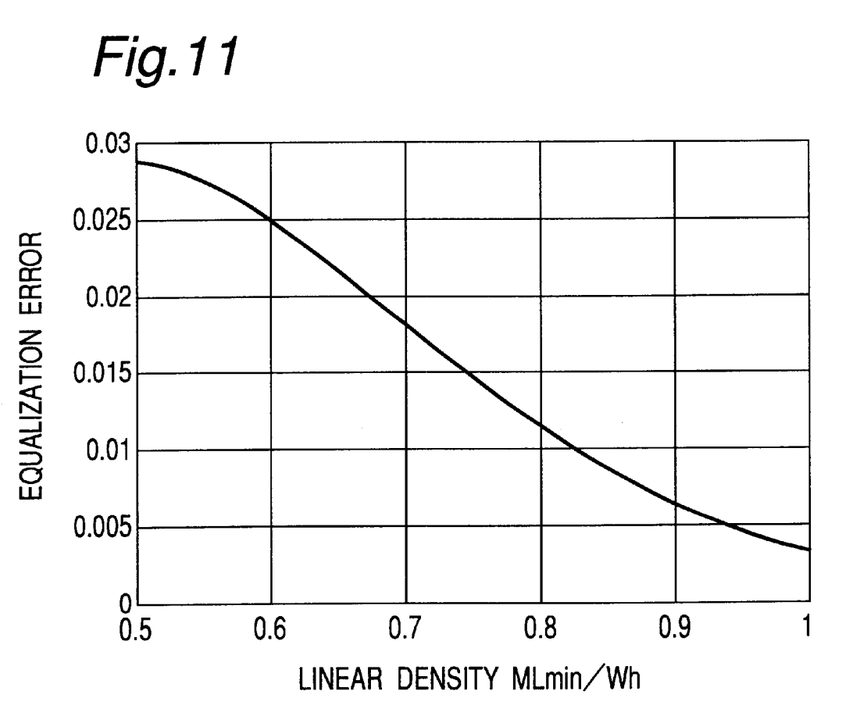
FIG. 11 is a graph showing the relationship between linear density and equalization error.

The present invention is particularly effective with high density recording where InT and (AnT+BnT) deviate from a proportional relationship in the waveform when amplitude limiting (trimming at level X1) is not applied. The relationship between linear density and 4T mark error with a conventional waveform equalization circuit in which amplitude limiting is not applied is shown in FIG. 11. It should be noted that linear density is defined as the ratio between the shortest mark length MLmin and the half width Wh of the light spot, and coefficient K of the waveform equalization circuit is the value K=−13T/(A3T+B3T) removing the intersymbol interference of 3T marks. This indicates that when the error is great, InT and (AnT+BnT) are far from a proportional relationship. The present invention is effective when the error in FIG. 11 is 0.010 or greater. With respect to linear density, the present invention is effective when the ratio of the shortest mark length and light spot half width is 0.82 or less. The invention is even more effective when the error is 0.018 or greater and linear density is 0.70 or less.

An example of intersymbol interference resulting from a mark following a space is described by way of example above, but the same applies when the space and mark are reversed as the sign simply inverts. Furthermore, the same also applies to intersymbol interference resulting from a mark before a space because this is equivalent to inverting the time base and AnT and BnT are simply reversed. In effect, the same applies to all combinations.

The same benefits are achieved with modulation code in which 2T is the shortest mark, such as in (1,7) modulation, because 2T in (1,7) modulation substitutes for 3T in the above-described 8–16 modulation, and 3T in (1,7) modulation substitutes for 4T in 8–16 modulation.

As described above, offset g can be reduced and playback signal jitter can be improved by trimming peaks to at least one side, such as by cutting the amplitude in the positive direction, of the playback signal, and preferably playback signal S2 input to the waveform equalizer, before it is input to the digitizer 18.

What is claimed is:

1. A playback apparatus for reading marks written to an optical disc, comprising:
   an optical head means for emitting a light spot to a mark, reading the mark, and outputting a playback signal;
   a trimmer means for limiting amplitude in the positive direction and amplitude in the negative direction for the playback signals of an (n+2)T or longer mark length, and not limiting amplitude in the positive direction and amplitude in the negative direction for the playback signals of an nT or (n+1)T mark length in modulation code where the shortest mark is nT (where n is a positive integer and T is the period of the channel clock), so as to make positive and negative amplitudes substantially equal to each other;
   a waveform equalization circuit for amplifying the high frequency band of the output signal from the trimmer means; and
   a digitizing circuit for converting the output signal from the waveform equalization circuit to a binary signal using a predetermined threshold value.

2. An optical disc playback apparatus as described in claim 1, wherein the trimmer means limits amplitude when the ratio ML/Wh between pit length ML on the optical disc and half width Wh of the light spot satisfies the following relationship:

$$ML/Wh \geq R$$

$$1.0 \leq R \leq 1.35.$$

3. An optical disc playback apparatus as described in claim 1, wherein the ratio between the shortest mark length MLmin of the optical disc and the half width Wh of the light spot satisfies the relationship $$MLmin/Wh < 0.82.$$

4. A playback method for reading marks written to a writable optical disc, comprising:
  a step for emitting a light spot from an optical head to a mark, reading the mark, and outputting a playback signal;
  a step for limiting amplitude in the positive direction and amplitude in the negative direction for the playback signals of an (n+2)T or longer mark length, and not limiting amplitude in the positive direction and amplitude in the negative direction for the playback signals of an nT or (n+1)T mark length in modulation code where the shortest mark is nT (where n is a positive integer and T is the period of the channel clock), so as to make positive and negative amplitudes substantially equal to each other;
  a step for amplifying the signal of substantially equal positive and negative amplitudes; and
  a step for converting the amplified signal to a binary signal using a predetermined threshold value.

5. An optical disc playback method as described in claim 4, wherein amplitude is limited by the step for substantially equalizing positive and negative amplitudes when the ratio ML/Wh between pit length ML on the optical disc and half width Wh of the light spot satisfies the following relationship:

$$ML/Wh \geq R$$

$$1.0 \leq R \leq 1.35.$$

6. An optical disc playback method as described in claim 4, wherein the ratio between the shortest mark length MLmin of the optical disc and the half width Wh of the light spot satisfies the relationship $$MLmin/Wh < 0.82.$$

* * * * *

UNITED STATES PATENT AND TRADEMARK OFFICE
CERTIFICATE OF CORRECTION

PATENT NO.   : 6,665,250 B1
DATED          : December 16, 2003
INVENTOR(S) : Junichi Minamino et al.

It is certified that error appears in the above-identified patent and that said Letters Patent is hereby corrected as shown below:

<u>Title page, Item [54] and Column 1, lines 1 and 2,</u>
Change "OPTICAL DISC PLAYBACK AND PLAYBACK METHOD" to
-- OPTICAL DISC PLAYBACK APPARATUS AND PLAYBACK METHOD --.

Signed and Sealed this

Thirteenth Day of April, 2004

JON W. DUDAS
*Acting Director of the United States Patent and Trademark Office*